(No Model.)
A. C. FAIRBANKS.
WHEEL RIM.
No. 530,172. Patented Dec. 4, 1894.
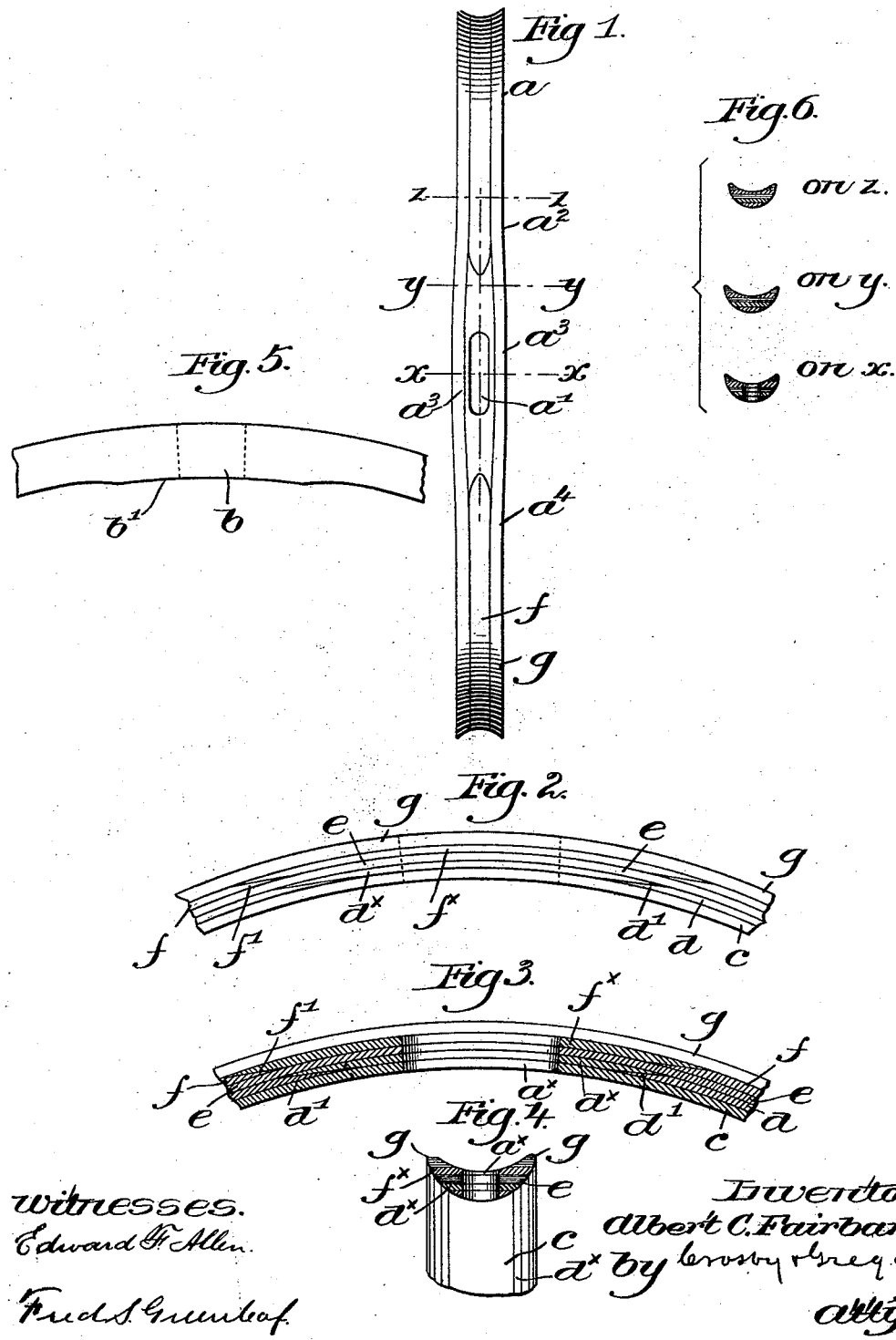
Witnesses.
Edward F. Allen
Fred S. Greenleaf
Inventor.
Albert C. Fairbanks.
by Crosby & Gregory
attys.

UNITED STATES PATENT OFFICE.

ALBERT C. FAIRBANKS, OF BOSTON, MASSACHUSETTS.

WHEEL-RIM.

SPECIFICATION forming part of Letters Patent No. 530,172, dated December 4, 1894.

Application filed January 9, 1894. Serial No. 496,276. (No model.)

*To all whom it may concern:*

Be it known that I, ALBERT C. FAIRBANKS, of Boston, county of Suffolk, State of Massachusetts, have invented an Improvement in Wheel-Rims, of which the following description, in connection with the accompanying drawings, is a specification, like letters on the drawings representing like parts.

In the manufacture of wheel rims for pneumatic tires, wherein the tire is composed of an outer tubular sheath and an inner inflatable tube, an opening is made in the rim through which the inner tube may be passed, and also to receive the stem of the valve by means of which the inner tube is inflated. This opening weakens the rim adjacent thereto, the material removed decreasing the resistance to strains, and is in consequence the cause of numerous fractures, especially in wooden rims. Furthermore, the balance of the rim is impaired, and in a light weight machine it is very noticeable and objectionable.

This invention has for its object the production of a wheel rim of substantially equal strength throughout its extent, and evenly balanced.

In accordance therewith my invention consists in a wheel rim for pneumatic tires, having an opening therein for the tire valve, the cross section of the rim being permanently increased in area at or adjacent the said opening, to maintain the strength and balance of the rim, substantially as will be described.

Other features of my invention will be hereinafter described and particularly pointed out in the claims.

Figure 1 is an edge view, in elevation, of a wheel rim embodying my invention. Fig. 2 is a side elevation of a portion of a laminated rim, enlarged, showing strengthening plies. Fig. 3 is a longitudinal vertical section thereof. Fig. 4 is a cross section, enlarged, taken on the line $x-x$, Fig. 1. Fig. 5 is a side elevation of a portion of a wheel rim, showing a modified form of my invention, and Fig. 6 shows a series of cross sections taken on the lines $x$, $y$ and $z$, Fig. 1.

I have herein shown the wheel rim $a$ as concaved around its periphery to receive the usual pneumatic tire, not shown, the rim having an opening $a'$ therein, through which the inflatable tube of the tire is passed, the shank of the usual valve connected to said tube passing through said opening.

The removal of material from the rim to make the opening weakens the rim at or adjacent thereto, particularly in the case of wooden rims, whether the rim is composed of a single piece or of layers or laminæ of suitable thickness. The balance of the rim is also destroyed by the removal of the material to make such opening. As the grain of the wood extends in the direction of the length of the strip or strips forming the rim, the wood has a tendency to split at one or both sides of the opening, and I have provided means whereby such tendency is obviated.

Referring to Fig. 1, the rim is shown as enlarged adjacent the opening $a'$, the enlargement preferably increasing from a point as $a^2$, at one side of the said opening, to the portion $a^3$, adjacent the opening, thence gradually decreasing to a point $a^4$ on the other side of the opening. The enlargement is somewhat exaggerated in the drawings, to more clearly present it to the eye, and as a matter of practice the amount of material added by the enlargement is substantially equal to that removed from the rim in making the opening $a'$.

Viewing the sections shown in Fig. 6, the one on the line $x$, Fig. 1, is taken through the maximum enlarged portion $a^3$, adjacent the opening $a'$, the section on $y$, Fig. 1, is taken at a point between the normal portion of the rim and the portion $a^3$, and the section on $z$, Fig. 1, is taken through the normal portion of the rim $a$, the total area of the cross-section on $x$ being the greatest, the area of the cross-sections gradually decreasing from each side thereof symmetrically until the normal is reached, as shown in the cross section on line $z$. By thus constructing the rim the amount of material in any given segment thereof is substantially equal, and the uniform strength and balance of the rim are thereby maintained intact.

In the modification shown in Fig. 5 the rim is enlarged at its inner circumference, as at $b'$, adjacent the opening $b$, shown by dotted lines, so that practically the same results are obtained as by the hereinbefore described construction.

Wooden rims have a tendency to split at one or the other side of the opening made therein, following the grain of the wood, and as best shown in Figs. 2, 3 and 4, I have devised means for overcoming this tendency, the rim as illustrated in said figures being made up of plies or laminæ of wood $c, d, e, f$ and $g$, cemented together and properly shaped, the grain of the plies running lengthwise thereof.

The plies or laminæ $d$ and $f$ are chamfered or shaved down at their extremities, as at $d'$ and $f'$, respectively, at opposite sides of the opening $a^\times$, and short stay pieces $d^\times$ and $f^\times$ are inserted between them, the ends of the said pieces being suitably worked down, as shown in Figs. 2 and 3.

In preparing the stay pieces $d^\times$ and $f^\times$ they are so selected that the grain of the wood will run diagonally to the grain of the laminæ, and preferably the grain of the piece $d^\times$ will cross the grain of the piece $f^\times$, so that the resistance offered by these stay pieces is sufficient to prevent splitting of the rim.

The pieces are secured in place between adjacent plies or laminæ, as $c$ and $e$, or $e$ and $g$, and the rim may be enlarged adjacent to the opening therein, as hereinbefore described, or if the opening be a small one the stay pieces may be used alone, to prevent splitting.

This invention is not restricted to the external shape of the rim, nor to its particular mode of construction, nor to the shape or size of the opening therein, as the same may be modified or varied without departing from the spirit of my invention.

I claim—

1. A wheel rim for pneumatic tires, having an opening therein for the tire valve, the cross-section of the rim being permanently increased in area at or adjacent the said opening, to maintain the strength and balance of the rim, substantially as described.

2. A wooden wheel rim for pneumatic tires, having an opening in the face thereof for the tire valve, the size of the rim having a gradual and permanent increase from the normal at each side of said opening up to the opening, whereby the strength and balance of the rim are maintained, substantially as described.

3. A wooden wheel rim for pneumatic tires, having an opening therein for the tire valve, the cross section of the tire increasing in area at or adjacent the said opening, and a stay piece inserted in the rim, the grain of the said piece crossing the grain of the rim, substantially as described.

4. A wooden wheel rim composed of plies or laminæ, an opening in said rim, and short stay pieces inserted at the opening between the plies forming the rim, the grain of the stay pieces crossing each other and the grain of the rim forming plies or laminæ, whereby splitting of the latter at the opening is prevented, substantially as described.

In testimony whereof I have signed my name to this specification in the presence of two subscribing witnesses.

ALBERT C. FAIRBANKS.

Witnesses:
GEO. W. GREGORY,
JOHN C. EDWARDS.